June 11, 1968  C. G. EILERS ET AL  3,388,214
COMPATIBLE STEREO SOUND SYSTEM EMPLOYING TIME
MODULATION TECHNIQUES
Filed Feb. 3, 1965  6 Sheets-Sheet 1
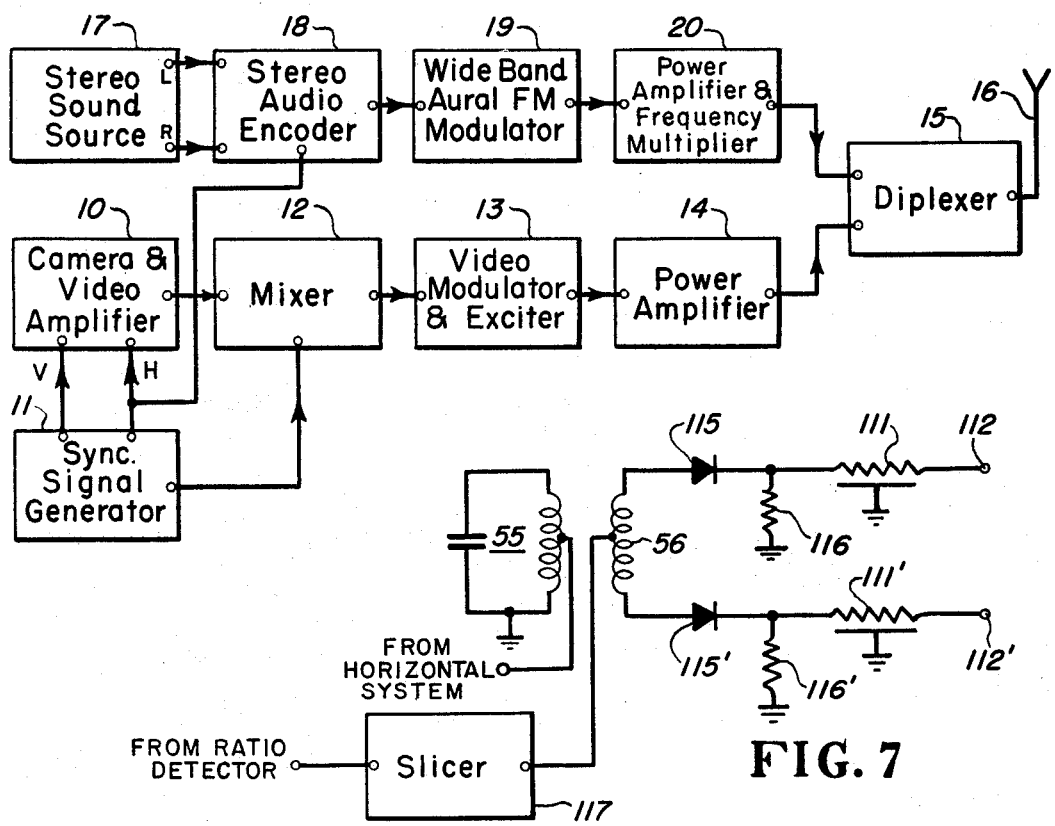
FIG. 1
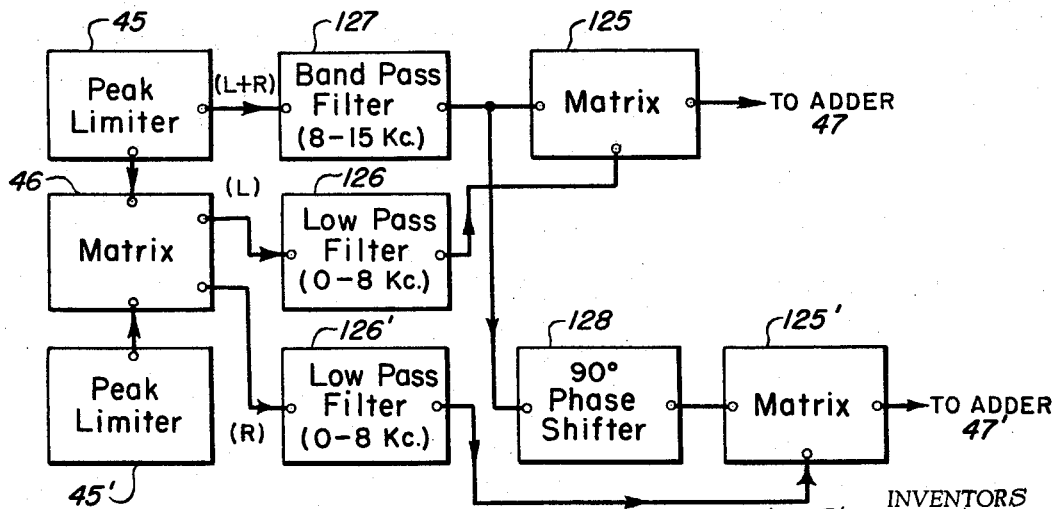
FIG. 7
FIG. 10
INVENTORS
Carl G. Eilers
Jouke N. Rypkema
By Francis W. Crotty
Atty.

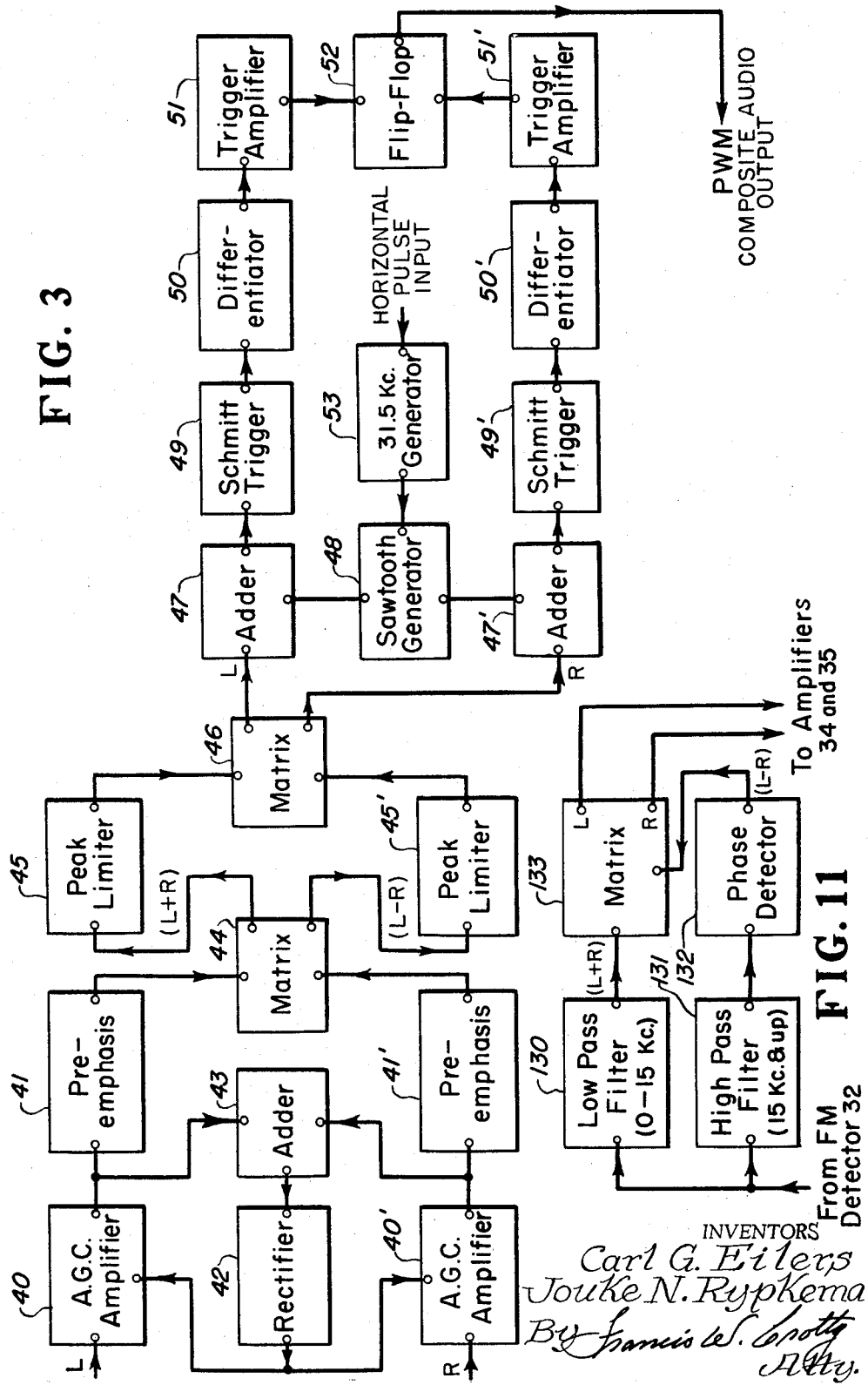

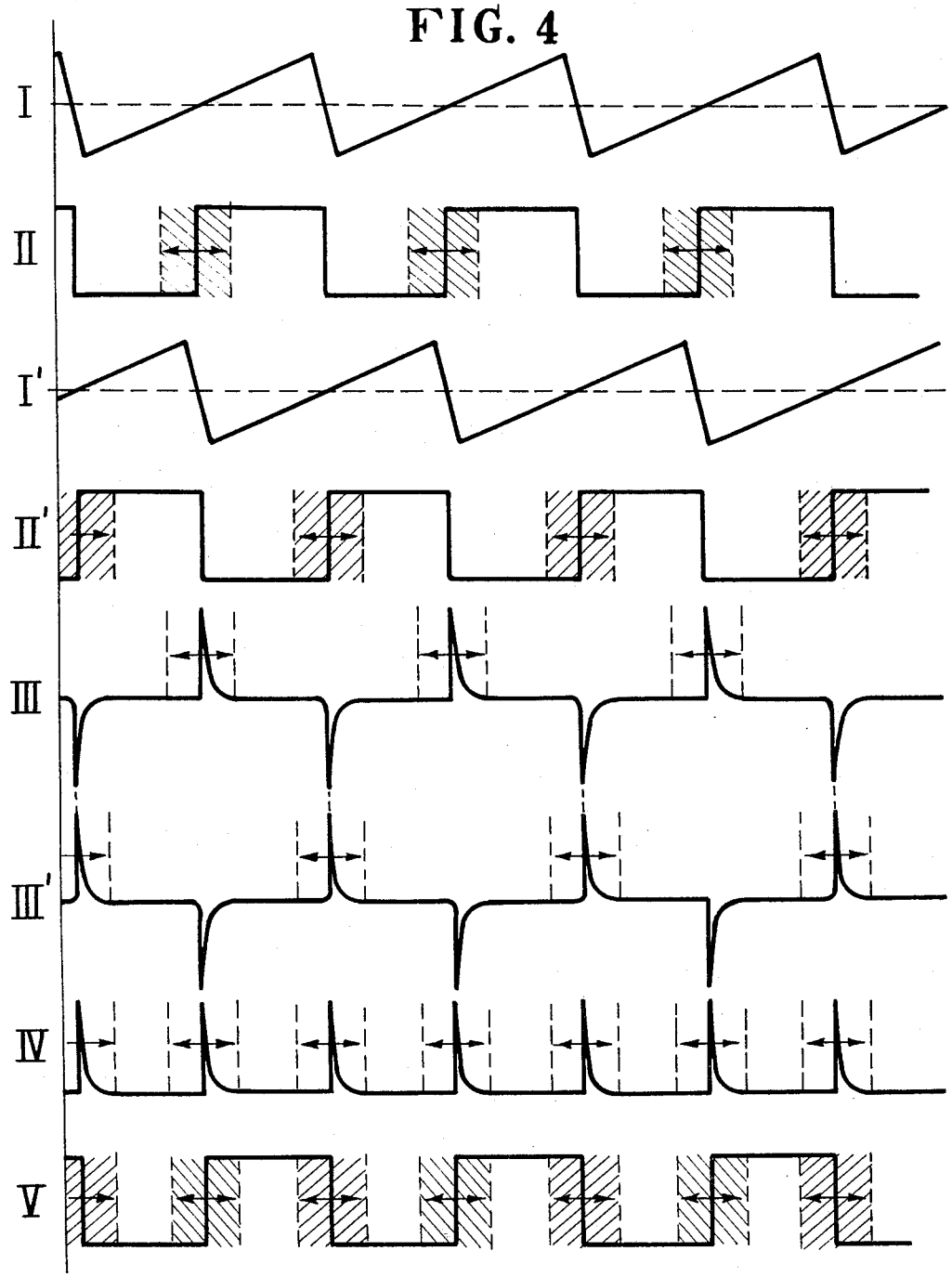

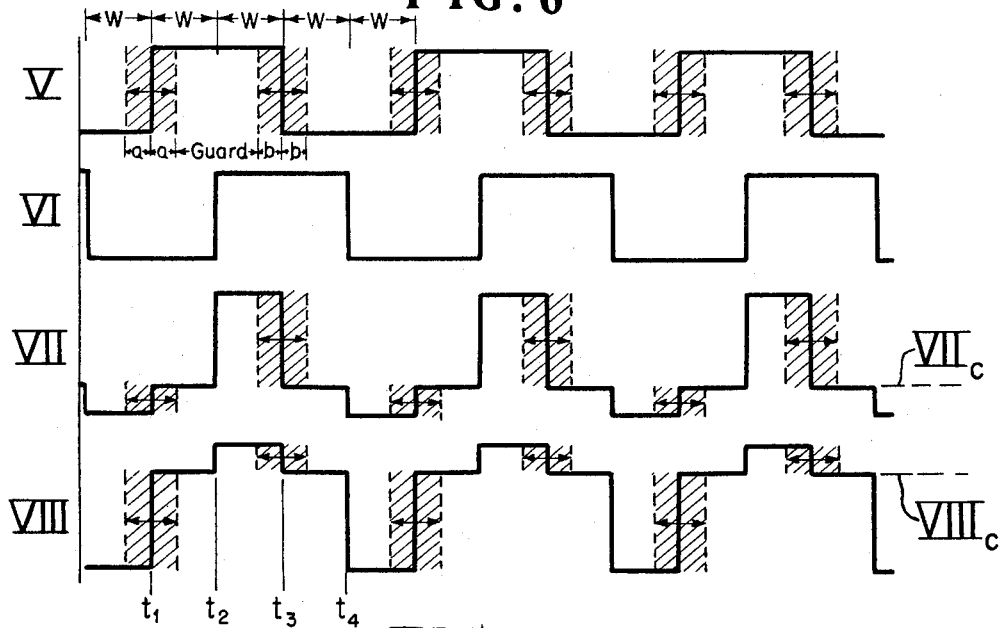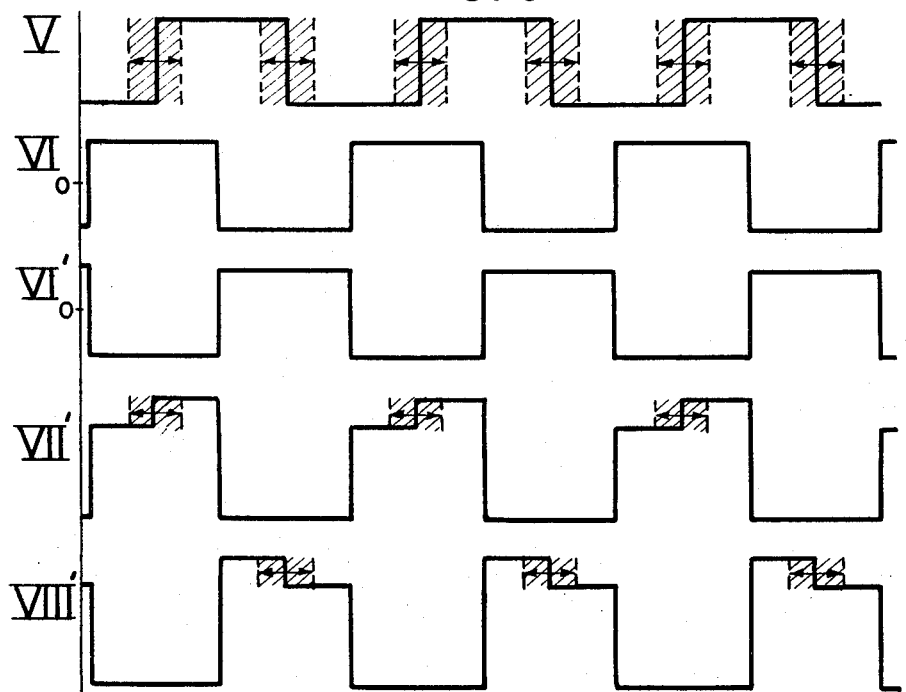

(FOR L OR R ONLY)

(FOR L=R)

(FOR L=-R)

INVENTORS
Carl G. Eilers
Jouke N. Rypkema
By Francis W. Crotty
Atty.

United States Patent Office 3,388,214
Patented June 11, 1968

3,388,214
COMPATIBLE STEREO SOUND SYSTEM EMPLOY-
ING TIME MODULATION TECHNIQUES
Carl G. Eilers, Oak Park, and Jouke N. Rypkema, Villa
Park, Ill., assignors to Zenith Radio Corporation, Chi-
cago, Ill., a corporation of Delaware
Filed Feb. 3, 1965, Ser. No. 430,076
15 Claims. (Cl. 178—5.6)

The present invention is directed to a method of, and apparatus for, achieving compatible stereophonic sound reproduction by which is meant sound translation that may result in sterophonic reproduction by stereo apparatus and yet permits monaural sound reproduction with no substantial degradation by monophonic equipment. Although the invention is subject to general application, it is especially suited for the sound portion of a television system and, for convenience, it will be described in that environment.

Stereophonic sound reproduction is, of course, well known and has been practiced in a variety of forms for a number of different communication services. Most recently, the Federal Communications Commission has adopted standards by which stereophonic sound is attained on frequency modulation broadcasts. It has now been proposed that consideration be given to specifications to introduce stereophony to the sound program of television broadcasts which otherwise conform to current transmission specifications of the Federal Communications Commission. The method and system described and claimed herein is uniquely adapted to that purpose and permits stereo reproduction with very acceptable separation as well as monophonic reproduction without degradation as compared with reproduction of the sound program transmitted in accordance with currently outstanding specifications for television broadcasting.

Accordingly, it is a principal object of the invention to provide a novel method of and apparatus for compatible stereophonic sound which is especially suited for, although not restricted to, the sound program of television transmissions.

It is another object of the invention to provide a novel and compatible method of and apparatus for transmitting stereophonic sound.

A specific object of the invention is providing a new technique of stereophonic sound for television which is compatible and requires no modification of monophonic television receivers for utilizing the stereophonic sound program even though its reproduction therein is monaural.

Another specific object of the invention is to provide an intercarrier sound receiver for utilizing a television transmission of the vestigial side band type accompanied by a novel and compatible stereophonic sound program.

The method of transmitting a compatible stereophonic sound signal in accordance with the invention comprises the steps of developing a carrier of rectangular waveform having a repetition frequency that is high relative to the highest frequency of the audio spectrum to be transmitted. The leading edges of that carrier are time modulated in proportion to the amplitude of one of a pair of stereophonically related audio signals. The trailing edges of the carrier are further time modulated in proportion to the amplitude of the other of the pair of audio signals. The sense of this last-mentioned modulation, relative to the modulation of the leading edges, in such as to cause the average value of the resulting pulse-width-modulated (PWM) carrier to be equal to the sum of the pair of audio signals and also to cause like phase deviations of the leading and trailing edges of the PWM carrier to be related to the difference of the pair of audio signals. Further in accordance with the invention the carrier, pre-pared in accordance with such time modulation of its edges, is transmitted to receivers, usually by having it modulate a radio-frequency carrier wave.

In accordance with one specific embodiment of the invention, the square wave has a repetition frequency of approximately 30 kc., the pulse width modulation is restricted to 60 percent at each edge of the square wave and the PWM wave is frequency modulated on a radio frequency carrier with the modulation arranged so that the deviation of the RF carrier, in response to the square wave is approximately ±42 kc. This deviation in conjunction with the restriction on the percentage pulse width modulation of the rectangular wave signal, results in a deviation of the radiated RF carrier by the sum information of the audio signals in the amount of ±25 kc. This is the same deviation as the sound program in a conventional monophonic television broadcast and assures that the monophonic response to the stereophonic transmission is not degraded.

It may be demonstrated that the pulse-width-modulation system of stereophonic transmission may introduce distortion into the monophonic signal but that distortion may be minimized to an unperceptible, certainly to an acceptable, level in accordance with another technique of the invention. Specifically, a combining network is employed which provides modulation, identical except for a 90 degree phase shift, by the sum of the two audio signals above approximately 8 kc. to the leading and trailing edges of the rectangular wave signal while retaining below this frequency value a unique modulation of the leading edge by one of the audio signals and of the trailing edge of the other of those signals. Through this technique, distortion components caused by audio frequencies above 8 kc. are cancelled in the monophonic channel.

Another feature of the invention that may be used optionally is the derivation of the rectangular wave signal from the scanning arrangement of the television system. It is convenient, for example, to use as the rectangular wave a signal having a fundamental that is harmonically related to one of the scanning frequencies such as a frequency of twice the line-scanning frequency. Where this feature is adopted, a demodulation signal of the same wave form and frequency and of proper phase may easily be derived from the scanning system of the television receiver. It is, of course, to be understood that the rectangular wave need not have any unique relation to the scanning frequencies of the television system. If desired, a square wave frequency of any suitable value may be selected and a pilot component may be included in the transmission to accomplish synchronization of the pulse time demodulator at the receiver.

Stereophonic sound systems for intercarrier type television receivers are plagued by a form of noise referred to as intercarrier buzz. This is attributable to the fact that the video is a vestigial side band transmission and may also result from inadequate limiting in the receiver. In accordance with a further aspect of the subject invention, the sound channel which may branch from the final video intermediate frequency amplifier features exaltation of the video carrier to exhibit an effective frequency response characteristic which is flat at the frequency of the video IF carrier. This minimizes distortion otherwise attributable to vestigial transmission.

The features of the present invention which are believed to be novel are set forth with particularity in the appended claims. The invention, together with futher objects and advantages thereof, may best be understood by reference to the following description taken in connection with the accompanying drawings, in the several figures of which like reference numerals identify like elements, and in which:

FIGURE 1 is a schematic representation of a television transmitter employing a stereophonic sound system in accordance with the invention;

FIGURE 3 is a block diagram showing details of the stereo audio encoder of FIGURE 1;

Figure 2:
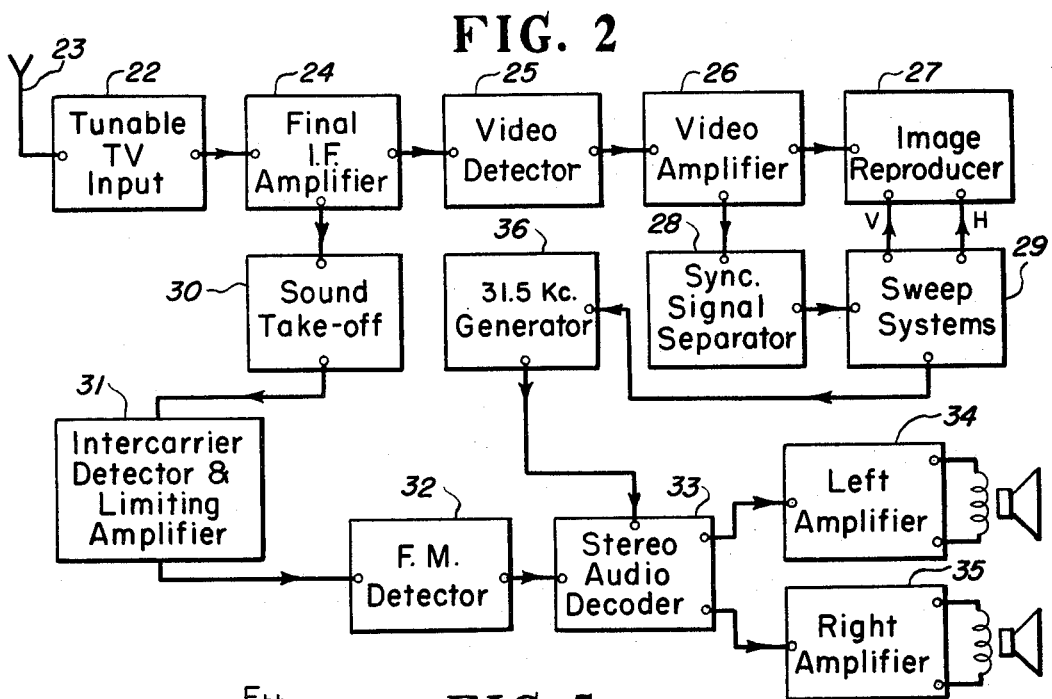
FIGURE 2 is a schematic representation of the receiver of such a system.
Figure 5:
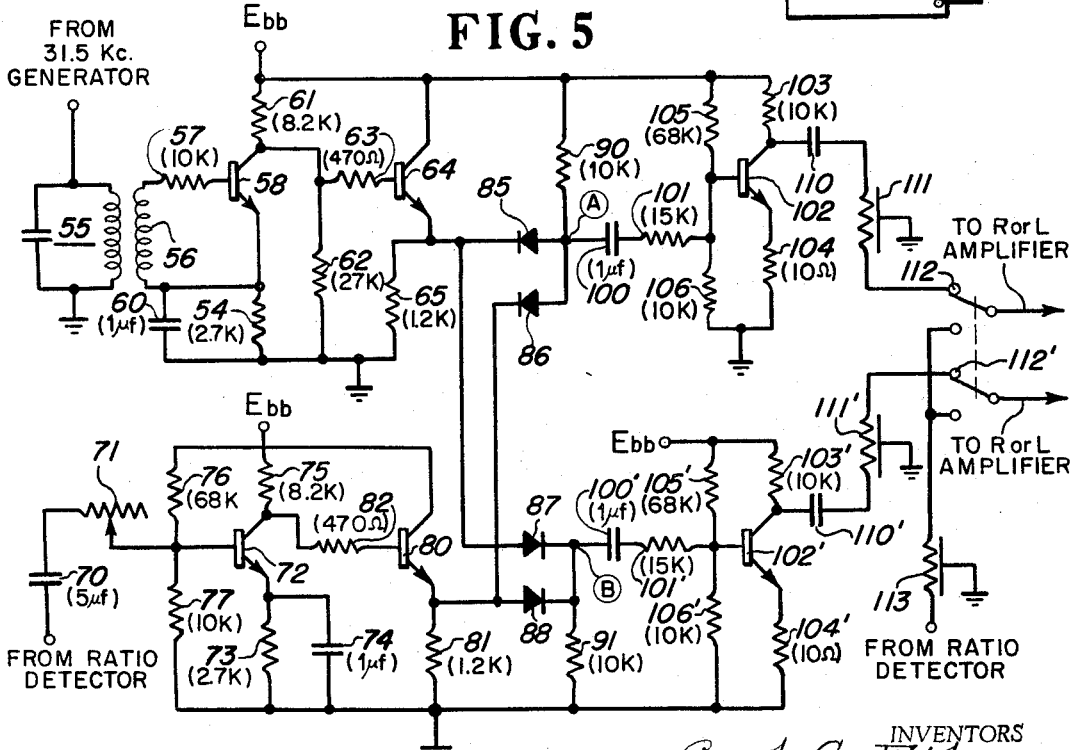
Figure 9A:
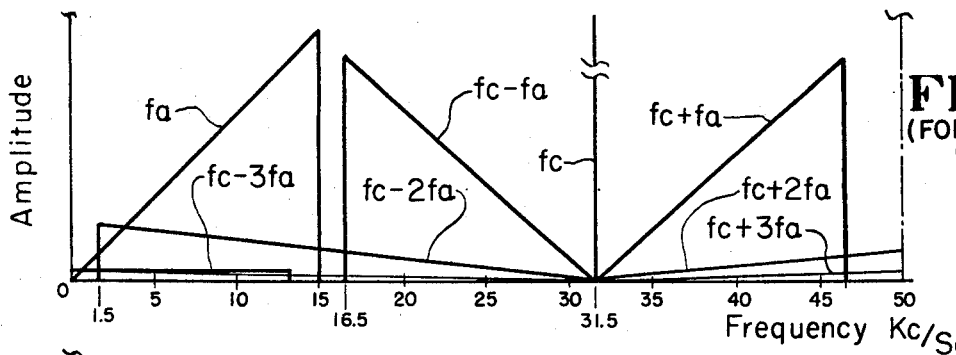

FIGURE 4 includes curves utilized in explaining the operation of the audio encoder;

FIGURE 5 is a schematic representation of a four diode type of pulse time demodulator that may be employed as the stereo audio decoder in the receiver of FIGURE 2;

FIGURE 6 includes curves used to explain the operation of the decoder of FIGURE 5;

FIGURE 7 shows a modified, two-diode type of stereo audio decoder;

FIGURE 8 comprises curves used to explain the operation of the decoder of FIGURE 7;

FIGURES 9a, b and c are frequency spectra illustrating characteristics of the stereophonic sound system;

FIGURE 10 is a modification of a portion of the audio encoder of FIGURE 3; and

FIGURE 11 is a modified pulse time demodulator.

For convenience, a generalized description will be given initially of the overall system including the transmitting arrangement of FIGURE 1 and its receiver of FIGURE 2. At the transmitter, there is a camera and video amplifier 10 for generating the usual video signal under the control of a timing or synchronizing signal generator 11. Both of these units are connected to a mixer 12 for developing a composite television signal for application to a video modulator and exciter 13 which is connected through a power amplifier 14 to a diplexer 15 and to a radiating antenna 16. The sound portion of the transmitter includes a source 17 arranged to developed at output terminals a pair of stereophonically related audio signals L and R. These terminals connect to one input of a stereo-audio encoder 18 which also receives a carrier of rectangular wave form, specifically a square wave signal having a repetition frequency high relative to the highest frequency of the audio spectrum to be transmitted. As previously indicated, the square wave signal, if chosen to have a fundamental that is related to one of the scanning frequencies of the system, may readily be derived from sync signal generator 11 and, as shown, a square wave related to the horizontal or line-scanning system in the video portion of the transmitter is applied to a second input of the audio encoder. The output terminal of this encoder connects to a wide-band aural FM modulator 19 which is connected through a power amplifier and frequency multiplier 20 to diplexer 15. It may be desirable to insert phase equalizing networks in the video and sound channels of the transmitter.

In considering the operation of the transmitter, it will be assumed that the transmission is in accordance with current standards of the Federal Communications Commission employing vestigial side band transmission. The camera of unit 10 scans the image of a scene in a series of fields of parallel lines under the control of line and field scanning signals from generator 11 and the video signal, after suitable amplification, is applied to mixer 12 which also receives the usual complement of timing signals such as line, field, equalizing and blanking signals as required to form the composite television signal. This signal amplitude modulates a carrier in modulator 13 and the modulated carrier is amplified in amplifier 14 and applied to antenna 16 through the diplexer 15 for radiation. Concurrently, the left and right signals characteristically derived for stereo sound transmission are applied to encoder 18 along with a square wave having a fundamental at twice the line frequency or 31.5 kc. In this encoder and in a fashion to be described more particularly hereafter, the leading edges of the square wave are modulated by the left audio signal L and the trailing edges of that signal are modulated by the right audio signal R thereby to develop a pulse-width-modulated (PWM) carrier to be employed as a modulating signal applied to modulator 19. The resulting frequency modulated signal, after frequency multiplication and power amplification in unit 20, is likewise applied to antenna 16 through diplexer 15 for radiation to receivers. All components of the transmitter, with the exception of stereo audio encoder 18, are of conventional design, construction and operation and it is, therefore, believed that no further description thereof is necessary.

The receiver of FIGURE 2 has an input 22 which will be understood to include the tunable radio frequency stages, heterodyning oscillator, RF detector, and initial stages of video IF amplification. The input of this unit connects with a receiving antenna 23 while its output connects with the final video IF amplifier 24, a video detector 25, video amplifier 26 and an image reproducer or cathode ray tube 27. The customary sync signal separator 28 has an input connected with video amplifier 26 and an output that drives the sweep systems 29 which supply line or horizontal and field or vertical sweep signals to image reproducer 27. The sound portion of the receiver is coupled to the final video IF amplifier 24 and includes a sound takeoff 30 which is a frequency selective circuit designed to exalt the video frequency IF carrier to the end that the effective frequency response characteristic of the sound channel is flat at least in the portion of the frequency spectrum around the video IF carrier in order to minimize intercarrier buzz since it is assumed that the receiver is of the intercarrier type. Connected to the sound takeoff is an intercarrier detector and limiting amplifier 31 which feeds an FM detector 32 such as a ratio detector. The FM detector is coupled to a stereo audio decoder or pulse time demodulator 33 which has a pair of output circuits represented by a pair of terminals one of which connects to the left amplifier and loudspeaker arrangement 34 while the other connects to the right amplifier and loudspeaker arrangement 35, these being arranged spatially for stereophonic sound reproduction. Since the square wave signal employed as the stereophonic carrier is related in frequency to the line frequency of the scanning system, stereo decoder 33 also receives a demodulation signal that is derived from the scanning system 29. More particularly, the fundamental of the square wave signal is twice the line scanning frequency and, therefore, a 31.5 kc. generator 36 having a synchronizing input connected to a line frequency output of sweep system 29 applies a square wave demodulation signal to an input of decoder 33.

Aside from the stereo audio decoder 33, all of the elements constituting the receiver of FIGURE 2 are conventional in design, construction and operation and further details thereof are not necessary. In operation, input 22 is tuned to select a television broadcast which is converted to an IF signal and delivered through amplifier 24 to video detector 25. After amplification in unit 26, the video information is used to intensity modulate the beam of cathode ray tube 27. A second output from video amplifier 26 is delivered to sync separator 28 which utilizes the synchronizing information thereof properly to control sweep system 29 so that the raster of the cathode ray tube is scanned in a series of fields of parallel lines in synchronization with scanning at the transmitter as required for correct image reproduction. The sound takeoff 38 supplies the IF signal to intercarrier detector 31 where the intercarrier component is developed and, after limiting and amplification, is supplied to FM detector 32. The output of this detector is the PWM square wave having edge modulation that represents the stereo program information. That information is derived in decoder 33 under the control of the demodulation signal from generator 36. The left and right audio signals are separately delivered to amplifier-speaker arrangements 34 and 35 to effect stereophonic reproduction. The limiter of unit 31 should have good limiting characteristics and the total bandwidth of the sound system for the described arrangement should be of the order of 200 kc. in order to obtain optimum performance.

It is now appropriate to consider in more detail the makeup and operation of stereo audio encoder 18 of FIGURE 1. For this purpose, reference is made to FIGURE 3. Since the television standards contemplate pre-emphasis, the left audio signal L is introduced through an AGC amplifier 40 to a pre-emphasis network 41 while the right audio signal R is applied through a similar amplifier 40′ to a pre-emphasis network 41′. The gain of amplifiers 40 and 40′ is controlled by an averaging AGC rectifier 42 to which the sum of the left and right audio signals is delivered through an adder 43. The output terminals of the pre-emphasis networks connect to an additive matrix 44 which delivers the sum (L+R) signal to a peak limiter 45 and the difference (L−R) signal to a similar peak limiter 45′. The output terminals of these limiters connect to a subtractive matrix 46 designed to recover separated L and R audio signals. The L output terminal of matrix 46 connects with one input of an adder 47 having a second input connected to a sawtooth generator 48. The output terminal of adder 47 connects with a Schmitt trigger circuit 49 which connects through a differentiating network 50 to a trigger or clipping amplifier 51. The output circuit of amplifier 51 connects with one input of a flip-flop circuit 52. The right audio signal goes through a similar channel of like components designated with the same reference numerals primed. Sawtooth generator 48 is driven from a 31.5 kc. pulse generator 53 which has a synchronizing input terminal connected with the horizontal scanning system of camera tube 10. In short, a line frequency or horizontal pulse derived from the horizontal scanning system of the camera tube synchronizes a second harmonic generator 53.

The individual components of the stereo audio encoder of FIGURE 3 are well known conventional devices that need not be described further although their collective operation in developing a PWM carrier will be explained with the aid of the curves of FIGURE 4. The arrangement from the L and R input terminals up to and including subtractive matrix 46 are the usual components employed for AGC and pre-emphasis plus peak limiting. They serve to provide peak limited left and right audio signals to the remaining components which are the ones principally concerned in the development of the pulse-width-modulated carrier. For convenience, initial consideration will be given to the modulation of the leading edges of the square wave carrier by the left audio signal.

Curve I is a sawtooth signal having the same fundamental frequency as the square wave of curve II. The broken horizontal line through the sawtooth curve represents the firing level of Schmitt trigger 49. If the effect of the L audio signal is neglected momentarily, the Schmitt trigger is rendered conductive at each instant the sawtooth signal crosses the firing level during its positive slope and is rendered nonconductive when the sawtooth crosses the firing level with the opposite slope. The control of the trigger by the sawtooth alone yields the square wave shown in full line in curve II. It has a duty cycle of 50 percent. If the instantaneous value of the left audio signal adds to the sawtooth component, the firing level is reached earlier than otherwise but on the other hand, if the left audio subtracts from the sawtooth component, the sawtooth is delayed in reaching firing level. As a consequence, the leading edge of the square wave carrier may fall within the shaded area associated with the curve II, its specific location being determined by the instantaneous amplitude of the left audio signal. As a consequence, the leading edges of the square wave are time modulated in proportion to the amplitude of the left one of the pair of stereophonically related audio signals.

It is noted in passing that the return or retrace portion of the sawtooth is sufficiently fast as not to be materially affected by the audio signal and, therefore, the position of the trailing edge of the square wave in curve II is not shown as varying in a time domain. As a practical matter, it may vary somewhat as it is difficult to obtain an infinite slope to the retrace portion of the sawtooth wave but, as will be made clear presently, the trailing edges of the square wave of curve II are discarded and are of no consequence in the development of the pulse-width-modulated carrier. Accordingly, they will be ignored. The output signal of trigger 49, curve II, is differentiated in unit 50 to develop the signal of curve III. Positive pulse components of this curve are desired and the negative polarity ones are not; the latter are discarded by the trigger or clipping amplifier 51.

In similar fashion, the right audio signal is utilized to time modulate the trailing edges of the square wave carrier to be transmitted. To accomplish this, the instantaneous amplitude of the right audio signal determines the crossings of the sawtooth wave of curve I′. This is, likewise, derived from generator 48 but is time displaced 90 degrees relative to the sawtooth applied to adder 47. Its crossings to render trigger 49′ conductive, if the modulation of audio signal R be neglected, occur essentially in time coincidence with the trailing edges of the square wave of curve II. The modulating influence of the right audio signal, however, results in the signal of curve II′ from trigger 49′. It is essentially the same as the signal of curve II from trigger 49 differing in its specific intelligence and phase. Differentiation of that signal in unit 50′ develops the signal of curve III′. Its positive polarity pulses are retained but its negative polarity components are discarded in trigger or clipping amplifier 51′ to the end that the signals applied to the two inputs of flip-flop 52 collectively constitute a sequence of positive pulse components as shown in curve IV, the even numbered ones being delivered by amplifier 51 and the intervening ones being delivered by amplifier 51′. The flip-flop circuit, which is an ordinary cross-coupled type of bistable multivibrator, responds to the successive pulses and develops as an output the signal of curve V. It is a square wave carrier that is pulse-width-modulated at its leading and trailing edges in accordance with the L and R audio signals, respectively.

It will be apparent that the relative polarities of the left and right signals and the sawtooth signals as applied to trigger circuits 49, 49′ determine the sense in which the leading and trailing edges of the final square wave are modulated relative to one another. The polarity is chosen to the end that the average value of the resulting pulse-width-modulated carrier is equal to the sum of the pair of audio signals while like-phase deviations of the leading and trailing edges of the pulse-width-modulated signal are related to the difference of the left and right audio signals. If these conditions are satisfied, as may be accomplished by controlling the sense in which the leading and trailing edges of the square wave are modulated, the resulting pulse-width-modulated carrier is, in fact, compatible and a monaural receiver in responding to the modulated carrier may produce the entire sound program monophonically. In the curves of FIGURE 4, the double headed arrows and the cross hatched areas indicate the range of pulse time modulation. The modulated square wave of curve V is used as a modulating signal for the FM radio frequency carrier that is transmitted from antenna 60.

The bandwidth of the tuned circuits in FM exciter 19 are made sufficiently wide that the slopes or the rise and fall times of the modulating signal of curve V are not unnecessarily restricted. The slopes are controlled only as necessary to prevent the spectrum of the FM signal from being excessively wide so that cross-talk of the sound into the picture of the receiver is not visible. Over-modulation in the pulse-width-modulator is avoided by peak limiters 45 and 45′ in conjunction with AGC amplifiers 40 and 40′.

Consideration will now be given to a suitable form of pulse time demodulator, that is to say, an illustrative circuit for stereo audio decoder 33 of FIGURE 2. As indicated in FIGURE 5, it has two signal inputs; one being a 31.5 kc. sine wave demodulation signal developed in generator 36 at the receiver and locked to the line-scanning frequency and the other being the PWM carrier obtained at the output of FM detector 32.

One input terminal of the demodulator connects to a circuit 55 which is tuned to the demodulation signal. It is coupled to an inductor 56 one terminal of which connects through a resistor 57 to the base of a triode n-p-n transistor 58 while its other terminal connects to the emitter of that transistor. The emitter is grounded through a resistor 54 by-passed by a capacitor 60 and the collector connects to a positive potential source $E_{bb}$ through a resistor 61. The collector 58 is also coupled to ground through a resistor 62.

An output is taken from the collector circuit of transistor 58 through a resistor 63 which connects from the collector of transistor 58 to the base of an n-p-n transistor 64 arranged as an emitter follower having its collector directly coupled to the potential source $E_{bb}$ and its emitter grounded through a resistor 65. The described circuitry is arranged to supply a square wave gating modulation signal to a four-diode circuit, transistor 58 being overdriven to convert the input sine wave to a square wave. In this, as well as in the other circuits illustrated in the drawings, the number in parentheses designates an illustrative value of the component with which it is associated.

The PWM signal is similarly applied to the four-diode gate circuit from its input terminal through a coupling capacitor 70 and a variable resistor 71 which connects with the base of an n-p-n transistor 72 functioning as either a slicer or linear amplifier. Its emitter is coupled to ground through a resistor 73 by-passed by a capacitor 74 and is collector connects to the potential supply $E_{bb}$ through a resistor 75. The base of the transistor is also connected to the junction of resistors 76 and 77 which form a potential divider across the power supply. The output of amplifier 72 is applied to the diodes through an emitter follower comprising an n-p-n transistor 80 having a collector connected to the potential source, having an emitter grounded through a resistor 81 and having its base coupled to the collector of transistor 72 through a resistor 82.

The diodes constituting the gate or demodulator are designated 85, 86, 87 and 88. The anodes of diodes 85, 86 connect to the potential supply through a resistor 90 and the cathodes of the remaining pair connect to ground through a resistor 91. The cathode of diode 85 and the anode of diode 87 are connected together, as are the cathode of diode 86 and the anode of diode 88.

A pair of output signals are derived from the demodulator through slicing amplifiers and are applied to the de-emphasis networks serving to couple the demodulator to the amplifier-speaker arrangements 34 and 35. One output is taken through a coupling capacitor 100 and a resistor 101 which connects to the base of a transistor 102. Its collector connects to the power supply through a resistor 103 and its emitter is grounded through a resistor 104. The base also connects to a voltage divider of resistors 105 and 106. The other output from the demodulator is through a similar circuit which has like component identified by the same reference characteristics primed. The coupling from amplifier 102 is through a capacitor 110, and de-emphasis network 111 to an output terminal 112. A similar output extends from the other amplifier to a terminal 112′. There is a two position switch which in the position shown connects output terminals 112 and 112′ to amplifier speaker arrangements 34, 35. Whether the signal output at terminal 112 is the left or right audio is determined by the polarity of the PWM signal from the ratio detector and the polarity of the gate or demodulation signal. These are selected to achieve the desired association of signal to speaker.

The second position of the switch connects the amplifier speaker arrangements to still another de-emphasis network 113 which connects to the output of FM detector 32. The switch is adjusted as shown for stereophonic reception and is shifted to its alternate position for monaural reception.

The operation of the pulse time demodulator of FIGURE 5 will be explained with reference to the curves of FIGURE 6 in which curve V, the output of FM detector 32 as developed across emitter resistor 81, is the same as the final curve representing the PWM signal of FIGURE 4. The square wave signal of curve VI is developed across emitter resistor 65 in response to the sine wave signal applied to the demodulator from generator 36. Curve VII indicates the potential variations at the point designated A from which one output is derived while curve VIII signifies the potential variations at the point B at which the remaining output is derived.

At the time $t_1$ when the PWM signal V increases in a positive direction, the potential of the emitter of transistor 80 increases similarly. This applies a positive potential to the cathode of diode 86 and that diode becomes substantially nonconductive. The potential at point A is determined by current flow through resistor 90, diode 85 and resistor 65 and increases slightly over the reference condition when both the PWM signal V and the demodulation signal VI have their least positive values. At the same time, a large current flows through diode 88 and resistor 91 causing the potential at point B to increase to a greater extent than the excursion at point A. These conditions prevail until the time $t_2$ when the demodulation signal of curve VI assumes its maximum positive value. At that time, transistor 64 becomes conductive, diode 85 is biased to cut off and diode 86 has previously been cut off so the potential at point A increases to its most positive value. The potential at point B experiences a lesser incremental increase as a result of current flow from emitter resistor 65 through diode 88 and resistor 91 and these conditions obtain until a time $t_3$. At time $t_3$ the PWM signal V undergoes a negative excursion, and transistor 80 cuts off. As a consequence, diode 86 becomes conductive and the potential at point A decreases sharply. At the same time, the current contribution from transistor 80 to resistor 91 terminates and the potential of point B undergoes a step decrease. Again, these conditions prevail until time $t_4$ when both the demodulation signal VI and the PWM signal V have their least positive values. When this occurs, transistor 64 cuts off, diode 85 becomes conductive and the starting conditions are restored with the potentials at points A and B returned to their initial values. Thereafter, the pattern of potential variation repeats, developing the signal of curve VII at point A and the signal of curve VIII at point B.

It is apparent from the shaded areas of curve VII that the signal which it represents its largely right audio and some left audio but to a much lesser degree. Complete separation of right and left information is accomplished by arranging amplifier 102 to serve as a clipper with its level at broken construction line $VII_c$. If this accomplished, the output is the portion of the curve above level $VII_c$ and contains the right audio signal but none of the left although it does also contain high frequency components which are discarded by the de-emphasis network 111 to present only the right audio signal to terminal 112.

Similarly, curve VIII predominantly represents the left audio signal but also has a minor contribution of the right audio signal. Limiting or clipping of this signal at level $VIII_c$ by transistor 102′ produces the left audio signal at terminal 112′, again because de-emphasis network 111′ attenuates unwanted high frequency components.

A two diode type of pulse time demodulator is shown in FIGURE 7. It has a tuned circuit 55 which is inductively coupled through winding 56 to diodes 115 and 115' having load resistors 116 and 116', respectively. Outputs are taken from the load circuits through the low pass filter or de-emphasis networks 111 and 111' and delivered to output terminals 112 and 112', respectively. In this arrangement, tuned circuit 55 is again excited from the horizontal system and develops a 31.5 kc. signal of sinusoidal wave form. The PWM signal from detector 32 is delivered through a slicer 117 to a center tap of winding 56, a slicer being used to preserve the sharp wave form of the PWM signal but may in some instances be omitted.

The operation of the modified pulse time demodulator is represented by the curves of FIGURE 8 but for convenience of illustration, it has been assumed that the demodulation signal is a square wave having a fundamental of 31.5 kc. The operation is, in all material respects, the same whether the wave form be that of a square wave or sine wave. It is assumed that the peak to peak amplitude of the demodulation signal exceeds that of the PWM signal and, therefore, diodes 115 and 115' only become conductive during positive excursions of the demodulation signal as applied to their anodes. This assumes the aspect of a fairly conventional gating system which develops, in response to the gate signals of curves VI and VI', the output signals of curves VII' and VIII' at load resistors 116, 116', respectively. Curve VII' for the conditions represented contains the left audio while curve VIII' contains the right audio signal. Translation of these signals through the low pass filter constituted by the de-emphasis networks permits only the left and right audio signals to be delivered to their assigned output terminals 112 and 112' and with proper weighting. In other words, it is not necessary to deliver the output of this type demodulator to a slicer.

It will be apparent from the curves of FIGURES 6 and 8 that the phases of the 31.5 kc. demodulation or gate signals are not critical since all that is required is that their transitions occur during the guard space present in the PWM square wave as designated in FIGURE 6. Phase variations of the horizontal pulses of the receiver scanning system, within the hold-in range of the automatic frequency control system included in such a receiver, do not affect separation of the derived left and right audio signals.

These curves further reflect that in each case the pulse-time demodulator has, in effect, two channels and includes gates which determine signal translation through these channels. The PWM wave from FM detector 32 and the demodulation or gating signal from tuned circuit 55 are applied to the pulse-time demodulator to develop at the output of each channel thereof a rectangular or square wave that is pulse width modulated. The applied waves have such relative phase that the output signal from one channel has modulation at only one of its edges and this represents one of the audio signals. At the same time, the output of the other channel is modulated only at its opposite edges and represents the other audio signal. The de-emphasis networks are averaging circuits at audio frequencies and supply only the wanted audio information of these output signals to the amplifier-speaker arrangement. Mathematical analysis of the described PWM signal reveals its compatibility and also indicates the possible monophonic distortion. A width modulated square wave signal, such as that represented by curve V of FIGURE 6, having both edges modulated with intelligence, may be considered as the sum of the leading-edge-modulated rectangular wave and a trailing-edge-modulated rectangular wave with the stationary or unmodulated edges of the two waves coinciding with each other at the center of the double edge modulated signal. If $F_R(t)$ represents the trailing-edge-modulated signal and $F_L(t)$ denotes the leading-edge-modulated signal, then the composite stereo signal is:

$$F_C(t) = F_R(t) + F_L(t) \quad (1)$$

If $\omega_L$ is the angular frequency of the left audio signal, $\omega_R$ is the angular frequency of the right audio signal, and $\omega_C$ the angular fundamental frequency of the rectangular or square wave, then the frequency spectra for the two single-edge-modulated waves may be expressed as:

$$F_R(t) = 2kM_R \cos \omega_R t + 2\sum_{m=1}^{\infty} \frac{\sin m\omega_c t}{m\pi}$$
$$- 2\sum_{m=1}^{\infty} \sum_{n=-\infty}^{n=\infty} \frac{J_n(2\pi m k M_R)}{m\pi} \sin\left(m\omega_c t + n\omega_R t - 2mk\pi - \frac{n\pi}{2}\right) \quad (2)$$

$$F_L(t) = 2kM_L \cos \omega_L t - 2\sum_{m=1}^{\infty} \frac{\sin m\omega_c t}{m\pi}$$
$$+ 2\sum_{m=1}^{\infty} \sum_{n=-\infty}^{n=\infty} \frac{J_n(2\pi m k M_L)}{m\pi} \sin\left(m\omega_c t + n\omega_L t + 2mk\pi + \frac{n\pi}{2}\right) \quad (3)$$

wherein:

$W$ = width of single-edge-modulated signal (unmodulated).
$k = W/2\pi$ = duty cycle of single-edge-modulated signal (unmodulated).
$a$ = peak excursion of leading edge.
$b$ = peak excursion of trailing edge.
$M_L = a/W$ = percentage modulation of leading edge.
$M_R = b/W$ = percentage modulation of trailing edge.
$m$ = order of harmonic of the rectangular wave.
$n$ = order of sideband of the modulated rectangular wave.

In order to maximize the audio modulation capability, $k$ is assigned the value 0.25 and if the appropriate substitutions are made in Equation 1, it may be written, for odd values of $m$, as follows:

$$F_C(t) = 0.5 M_R \cos \omega_R t + 0.5 M_L \cos \omega_L t$$
$$+ 2\sum_{m=1}^{\infty} \sum_{n=-\infty}^{\infty} \frac{J_n(m\pi/2M_L)}{m\pi} \sin(m\omega_c t + n\omega_L t + m\pi/2 + n\pi/2)$$
$$+ 2\sum_{m=1}^{\infty} \sum_{n=-\infty}^{\infty} \frac{J_n(m\pi/2M_R)}{m\pi} \sin[m\omega_c t + n(\omega_R t - \pi) + m\pi/2 + \pi/2] \quad (4)$$

The first two terms of Equation 4 represent the audio components recovered in monophonic reception or stated differently, these terms indicate that the average value of the PWM carrier is equal to the sum of the two audio signals which is a requirement for compatibility. Comparison of the two sine terms of Equation 4 shows phase modulation of two in-phase carriers by modulating signals that are 180° out of phase. These terms bear the difference signal or L−R information and correspond to the claim definition that like phase deviations of the leading and trailing edges of the PWM carrier are related to the difference of the two audio signals.

Figure 9B:
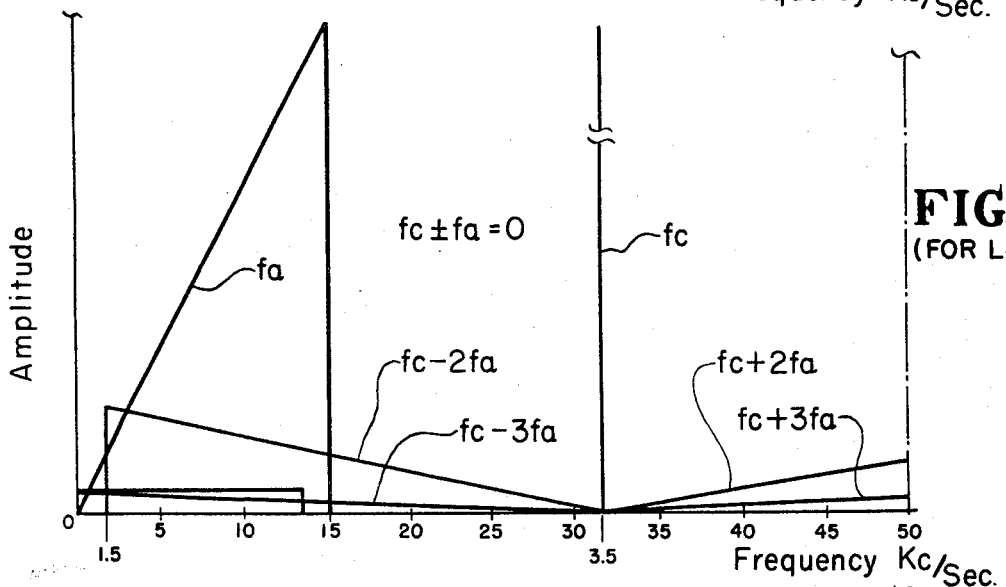
Figure 9C:
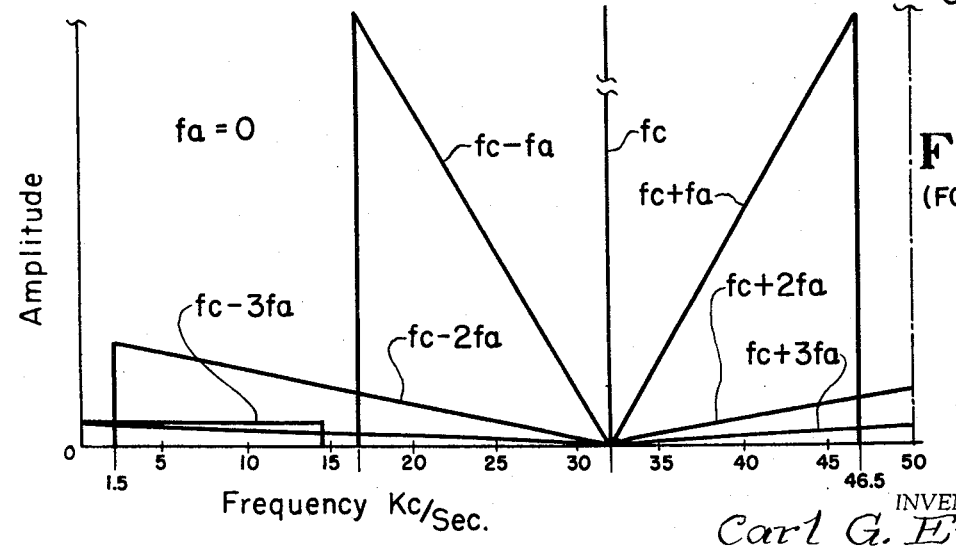

The lower sidebands of the fundamental frequencies of the square wave could fall in the audio frequency spectrum and contribute non-harmonic distortion to the monophonic signal. This is demonstrated in the frequency plot of FIGURES 9a, b and c. FIGURE 9a obtains for the condition of L=0 or R=0 and with a percentage of pulse width modulation of 60 percent. Moreover, the plot is restricted to the first, second and third order lower sidebands of the fundamental of the carrier which are designated by the legends $f_c - f_a$; $f_c - 2f_a$; and $f_c - 3f_a$, respectively, in which the fundamental frequency of the square wave is $f_c$ and $f_a$ represents an audio frequency. The extent to which the plot of the harmonics overlays the triangle $f_a$ of audio information indicates the contribution of distortion to the monophonic signal. The frequency plot of FIGURE 9b is essentially the same except that it represents the condition in which L=R. In FIGURE 9c, the conditions are the same except that now L=−R. The plot of the third order lower sideband is folded back on itself in all three figures since negative frequencies are meaningless.

In order to minimize this distortion, a restriction is imposed on the degree of pulse width modulation. Experience predicated on listening tests indicates a satisfactory level of distortion if the percentage pulse width modulation M is restricted to 60 percent with a square wave having a repetition frequency of approximately 30 kc.

For still further improvement, a compromise may be made between separation at high audio frequencies and monophonic signal distortion to attain a condition in which the monophonic signal has distortion components no greater than those prescribed from normal monophonic sound broadcasting. The specific choice of parameters is as follows:

| | |
|---|---|
| Percentage of pulse width modulation____percent__ | 60 |
| Maximum frequency of separation _____kc__ | 8 |
| Repetition rate of square wave _____kc__ | 31.5 |
| Distortion at high modulation frequencies percent__ | <3.5 |
| Deviation of radiated FM carrier by unmodulated square wave _____kc__ | ±42 |
| Deviation of radiated FM carrier by L+R____kc__ | ±25 |
| Rise of time of square wave_____microseconds__ | 4 |
| Maximum frequency of modulation of main channel _____kc__ | 15 |

A modification of the transmitter to accommodate this compromise and specification of parameters is shown in FIGURE 10 which indicates the addition of certain components to the transmitter of FIGURE 3. More specifically, the L and R or audio signals obtained from additive matrix 46 are applied to further additive matrices 125 and 125′ through components which effect a frequency restriction and a desired 90° relative phase. A low pass filter 126 couples the L output terminal of matrix 46 to matrix 125 and a similar filter 126′ connects the right signal output of matrix 46 to matrix 125′. Each has a cutoff at approximately one-quarter of the fundamental of the square wave or PWM carrier. In numbers, the pass band of filters 126 and 126′ is approximately 0 to 8 kc. Each matrix 125 and 125′ also receives from peak limiter 45 and through a bandpass filter 127, the L+R signal in the frequency range from appoximately one-quarter the fundamental of the square wave to the highest audio frequency to be transmitted. In absolute numbers, it is approximately a band from 8 to 15 kc. It is desirable that this band of the sum information be applied in phase quadrature to matrices 125 and 125′, and while that may be accomplished in a variety of ways, it is shown in the diagram as the result of a 90° phase shift network 128 ahead of matrix 125′. The output terminals of matrices 125 and 125′ connect to adders 47 and 47′ of the stereo encoder.

With the arrangement of FIGURE 10, the leading edge of the square wave of curve V is modulated by the portion of the left audio signal within the range 0 to 8 kc. and it is also modulated by the sum information within the range from 8 to 15 kc. Similarly, the trailing end of the square wave is modulated by the right audio signal in the frequency range from 0 to 8 kc. and by the sum information in the range from 8 to 15 kc. but subject to a 90° phase shift relative to the modulation of the leading edges by this same sum information. The limit frequency of 8 kc. is a frequency for which the term $f_c - 2f_a$ does not fall in the audio spectrum with a chosen fundamental square wave frequency of approximately 32 kc. The other limit of 15 kc. is merely an assignment of the highest audio frequency to be transmitted.

More generally, the cutoff frequency is determined in accordance with the following:

$$f_{max.} = \frac{f_c - f_{a\ max.}}{2} \quad (5)$$

where:

$f_{max.}$ = highest audio frequency of stereophonic reproduction $f_{a\ max.}$ = highest audio frequency to be transmitted $f_c$ = fundamental frequency of square wave.

It may be demonstrated that with this modulating technique, distortion components caused by audio frequencies above 8 kc. are cancelled in the monophonic channel but at the expense of a loss in separation above the modulation frequency chosen as the cross-over, 8 kc. for the illustrated embodiment.

By choosing the parameters as indicated above, the monophonic signal is identical to that now employed in normal television sound broadcasting and the stereophonic system is compatible in terms of monophonic signal to noise ratio as well as in terms of aural balance of left and right stereophonic audio signals. Tests have indicated that the criticalness of fine tuning is no greater with the described stereophonic sound than for a normal color television receiver. Of course, the described stereo system is applicable to color as well as to monochrome television.

If the square wave frequency is increased but the transmission techniques of FIGURE 10 are otherwise retained, separation may be extended. For example, use of a square wave fundamental of 2½ times the line scanning frequency permits separation to be obtained up to 12–14 kc. In general, the separation may be improved as the fundamental frequency of the square wave is increased although this imposes wider bandwidth requirements on the receiver, however, still retaining the transmission within the 6-megacycle television channel band limit. It is also recognized that the criticality of tuning tends to increase with the frequency of the square wave.

If desired, as shown in FIGURE 11, a filter 130 may separate the sum (L+R) information from the output of FM detector 32 and a 15 kc. high pass filter 131, which may include a phase equalizer, may select the above-identified phase modulated carriers present in the output of detector 32. These carriers may be demodulated in a phase detector 132 to derive (L−R) information for combination with the (L+R) signal in a matrix 133. Separated L and R signals are then available at output terminals of this matrix.

With the switch at the output of the pulse-time demodulator in its alternate or monophonic position, the receiver may utilize a conventional television broadcast having non-stereophonic or monophonic sound.

Of course, the described receiver may be employed for monophonic broadcasts but when this is done, the switch of the pulse time demodulator is shifted from its stereo to its monophonic position.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. The method of transmitting a compatible stereophonic sound signal which comprises the steps of:

developing a carrier of rectangular waveform having a repetition frequency high relative to the highest frequency of the audio spectrum to be transmitted;

time modulating the leading edges of said carrier in proportion to the amplitude of one of a pair of stereophonically related audio signals;

time modulating the trailing edges of said carrier in proportion to the amplitude of the other of said pair of audio signals and with a sense of modulation relative to the modulation of said leading edges to have the average value of the resulting pulse-width-modulated carrier equal to the sum of said pair of audio signals and to have like phase deviations of the leading and trailing edges of said pulse-width-modulated carrier related to the difference of said pair of audio signals;

and transmitting said pulse-width-modulated carrier.

2. In a television system having a predetermined scanning frequency, the method of transmitting a compatible stereophonic sound signal which comprises the steps of:

developing a carrier of rectangular waveform having a repetition frequency related to said scanning frequency and high relative to the highest frequency of the audio spectrum to be transmitted;

time modulating the leading edges of said carrier in proportion to the amplitude of one of a pair of stereophonically related audio signals;

time modulating the trailing edges of said carrier in proportion to the amplitude of the other of said pair of audio signals and with a sense of modulation relative to the modulation of said leading edges to have the average value of the resulting pulse-width-modulated carrier equal to the sum of said pair of audio signals and to have like phase deviations of the leading and trailing edges of said pulse-width-modulated carrier related to the difference of said pair of audio signals;

and transmitting said pulse-width-modulated carrier.

3. In a television system having a line-scanning system, the method of transmitting a compatible stereophonic sound signal which comprises the steps of:

developing from said line-scanning system a carrier of rectangular waveform having a repetition frequency high relative to the highest frequency of the audio spectrum to be transmitted;

time modulating the leading edges of said carrier in proportion to the amplitude of one of a pair of stereophonically related audio signals;

time modulating the trailing edges of said carrier in proportion to the amplitude of the other of said pair of audio signals and with a sense of modulation relative to the modulation of said leading edges to have the average value of the resulting pulse-width-modulated carrier equal to the sum of said pair of audio signals and to have like phase deviations of the leading and trailing edges of said pulse-width-modulated carrier related to the difference of said pair of audio signals;

and transmitting said pulse-width-modulated carrier.

4. The method of transmitting a compatible stereophonic sound signal which comprises the steps of:

developing a carrier of rectangular waveform having a repetition frequency of approximately 30 kc.;

time modulating the leading edges of said carrier in proportion to the amplitude of one of a pair of stereophonically related audio signals and with the pulse-width-modulation limited to 60 percent;

time modulating the trailing edges of said carrier in proportion to the amplitude of the other of said pair of audio signals, with the same percentage modulation, and with a sense of modulation relative to the modulation of said leading edges to have the average value of the resulting pulse-width-modulated carrier equal to the sum of said pair of audio signals and to have like phase deviations of the leading and trailing edges of said pulse-width-modulated carrier related to the difference of said pair of audio signals;

and frequently modulating a second carrier with said pulse-width-modulated carrier with a deviation, in response to the first-mentioned carrier alone, of approximately ±42 kc.

5. The method of transmitting a compatible stereophonic sound signal which comprises the steps of:

developing a carrier of rectangular waveform having a repetition frequency $f_c$ high relative to the highest frequency of the audio spectrum to be transmitted;

time modulating the leading edges of said carrier in proportion to the amplitude of that part of one of a pair of stereophonically related audio signals that falls in the frequency spectrum 0 to approximately ¼ $f_c$ and also with that part of the sum of said pair of signals that falls in the frequency spectrum from approximately ¼ $f_c$ to the highest audio frequency to be transmitted;

time modulating the trailing edges of said carrier in proportion to the amplitude of that part of the other of said pair of audio signals that falls in said 0 to ¼ $f_c$ frequency spectrum as well as said sum of said pair of signals within said frequency spectrum ¼ $f_c$ to said highest audio but shifted 90 degrees and with a sense of modulation relative to the modulation of said leading edges to have, over the frequency spectrum of approximately 0 to ¼ $f_c$, he average value of the resulting pulse-width-modulated carrier equal to the sum of said pair of audio signals and to have, over said 0 to ¼ $f_c$ frequency spectrum, like phase deviations of the leading and trailing edges of said pulse-width-modulated carrier related to the difference of said pair of audio signals;

and transmitting said pulse-width-modulated carrier.

6. A system for transmitting a television signal accompanied by a compatible stereophonic sound signal comprising:

means for developing a carrier of rectangular waveform having a repetition frequency high relative to the highest frequency of the audio spectrum to be transmitted;

means for time modulating the leading edges of said carrier in proportion to the amplitude of one of a pair of stereophonically related audio signals;

means for time modulating the trailing edges of said carrier in proportion to the amplitude of the other of said pair of audio signals and with a sense of modulation relative to the modulation of said leading edges to have the average value of the resulting pulse-width-modulated carrier signal equal to the sum of said pair of audio signals and to have like phase deviations of the leading and trailing edges of said pulse-width-modulated carrier related to the difference of said pair of audio signals;

and means for transmitting said pulse-width-modulated carrier.

7. A system for transmitting a television signal accompanied by a compatible stereophonic sound signal comprising:

means including a sweep system for generating a video program signal;

means for developing from said sweep system a carrier of rectangular waveform having a repetition frequency high relative to the highest frequency of the audio spectrum to be transmitted;

means for time modulating the leading edges of said carrier in proportion to the amplitude of one of a pair of stereophonically related audio signals;

means for time modulating the trailing edges of said carrier in proportion to the amplitude of the other of said pair of audio signals and with a sense of modulation relative to the modulation of said leading edges to have the average value of the resulting pulse-width-modulated carrier equal to the sum of said pair of audio signals and to have like phase deviations of the leading and trailing edges of said pulse-width-modulated carrier related to the difference of said pair of audio signals;

and means for transmitting said pulse-width-modulated carrier.

8. A system for transmitting a stereophonic sound signal comprising:
means for developing a pair of stereophonically related audio signals;
means for developing a carrier of rectangular waveform having a repetition frequency $f_c$ high relative to the highest frequency of the audio spectrum to be transmitted;
means for time modulating the leading edges of said carrier;
means for applying to said leading-edge modulating means that part of one of said audio signals within the frequency spectrum from approximately 0 to ¼ $f_c$ and that part of the sum of said pair of audio signals that falls in the frequency spectrum from approximately ¼ $f_c$ to the highest audio frequency to be transmitted;
means for time modulating the trailing edges of said carrier;
means for applying to said trailing-edge modulating means that part of the other of said audio signals within said 0 to ¼ $f_c$ frequency spectrum and that aforesaid part of the sum of said pair of audio signals but at a phase of 90 degrees relative to said sum part as applied to said leading-edge modulating means;
and means for transmitting said pulse-width-modulated carrier.

9. A system for transmitting a stereophonic sound signal comprising:
means for developing a pair of stereophonically related audio signals;
matrix and filter means, coupled to said audio signal developing means, for deriving that part of each of said audio signals within the frequency spectrum from approximately 0 to ¼ $f_c$ and for deriving the sum of said pair of audio signals within the frequency spectrum from approximately ¼ $f_c$ to the highest audio frequency to be transmitted;
means for developing a carrier of rectangular waveform having a repetition frequency $f_c$ high relative to the highest frequency of the audio spectrum to be transmitted;
means for time modulating the leading edges of said carrier;
means for applying to said leading-edge modulating means that aforesaid part of one of said audio signals and said sum of said pair of audio signals;
means for time modulating the trailing edges of said carrier;
means for applying to said trailing-edge modulating means that aforesaid part of the other of said audio signals and said sum of said pair of audio signals shifted in phase 90 degrees;
and means for transmitting said pulse-width-modulated carrier.

10. A system for receiving a television program accompanied by a compatible sound signal in the form of a carrier frequency-modulated by a pulse-width-modulated rectangular wave having leading edge modulation representing one of a pair of stereophonically related audio signals, having trailing edge modulation representing the other of said pair of audio signals, and having an average value equal to the sum of said audio signals, said system comprising:
means including a frequency modulation detector for deriving from said sound signal said pulse-width-modulated wave;
pulse-time demodulation means coupled to said detector and having two output circuits for deriving one of said pair of audio signals at one of said output circuits and for deriving the other of said pair of audio signals at the other of said output circuits;
a pair of audio amplifier-loudspeaker arrangements spatially related for stereophonic sound reproduction;
and low pass filter means for coupling said amplifier-speaker arrangements to said output circuits, respectively.

11. A system for receiving a television program accompanied by a compatible sound signal in the form of a carrier frequency-modulated by a pulse-width-modulated rectangular wave having leading edge modulation representing one of a pair of stereophonically related pre-emphasized audio signals, having trailing edge modulation representing the other of said pair of audio signals, and having an average value equal to the sum of said audio signals, said system comprising:
means including a frequency modulation detector for deriving from said sound signal said pulse-width-modulated wave;
pulse-time demodulation means coupled to said detector and having two output circuits for deriving one of said pair of audio signals at one of said output circuits and for deriving the other of said pair of audio signals at the other of said output circuits;
a pair of audio amplifier-loudspeaker arrangements spatially related for stereophonic sound reproduction;
and low pass filter means, including a pair of de-emphasis networks, for coupling said amplifier-speaker arrangements to said output circuits, respectively.

12. A system for receiving a television program accompanied by a compatible sound signal in the form of a carrier frequency-modulated by a pulse-width-modulated rectangular wave having leading edge modulation representing one of a pair of stereophonically related pre-emphasized audio signals, having trailing edge modulation representing the other of said pair of audio signals, and having an average value equal to the sum of said audio signals, said system comprising:
a scanning system;
means including a frequency modulation detector for deriving from said sound signal said pulse-width-modulated wave;
pulse-time demodulation means having two output circuits for deriving one of said pair of audio signals at one of said output circuits and for deriving the other of said pair of audio signals at the other of said output circuits;
means for applying said pulse-width-modulated wave to said demodulation means;
means for deriving from said scanning system and for concurrently applying to said demodulating means a demodulation signal having a frequency corresponding to the fundamental of said pulse-width-modulated wave;
a pair of audio amplifier-loudspeaker arrangements spatially related for stereophonic sound reproduction;
and a pair of de-emphasis networks coupling said amplifier-speaker arrangements to said output circuits, respectively.

13. An intercarrier-sound receiver for utilizing a television transmission of the vestigial sideband type accompanied by a compatible sound signal in the form of a carrier frequency-modulated by a pulse-width-modulated rectangular wave having leading edge modulation representing one of a pair of stereophonically related pre-emphasized audio signals, having trailing edge modulation representing the other of said pair of audio signals, and having an average value equal to the sum of said audio signals, said system comprising:
a video intermediate-frequency amplifier and a sound channel coupled to said amplifier, having a frequency-response characteristic which is flat over a portion of the frequency spectrum including the video intermediate-frequency carrier, said sound channel comprising:
an intercarrier-sound detector;
an intercarrier amplifier and amplitude limiter;
a frequency modulation detector for deriving from said sound signal said pulse-width-modulated wave;
pulse-time demodulation means coupled to said detector and having two output circuits for deriving one of said pair of audio signals at one of said output circuits and for deriving the other of said pair of audio signals at the other of said output circuits;
a pair of audio-amplifier-loudspeaker arrangements spatially related for stereophonic sound reproduction;
and a pair of de-emphasis networks coupling said amplifier-speaker arrangements to said output circuits, respectively.

14. The method of transmitting a compatible stereophonic sound signal which comprises the steps of:
developing a carrier of rectangular waveform having a repetition frequency $f_c$ high relative to the highest frequency of the audio spectrum to be transmitted;
time modulating the leading edges of said carrier in proportion to the amplitude of that part of one of a pair of stereophonically related audio signals that falls in the frequency spectrum 0 to $f_{max.}$ and also with that part of the sum of said pair of signals that falls in the frequency spectrum from $f_{max.}$ to the highest audio frequency to be transmitted, where $f_{max.}$ is the highest frequency of stereophonic reproduction;
time modulating the trailing edges of said carrier in proportion to the amplitude of that part of the other of said pair of audio signals that falls in said 0 to $f_{max.}$ frequency spectrum as well as said sum of said pair of signals within said frequency spectrum $f_{max.}$ to said highest audio but shifted 90 degrees and with a sense of modulation relative to the modulation of said leading edges to have, over the frequency spectrum of approximately 0 to $f_{max.}$, the average value of the resulting pulse-width-modulated carrier equal to the sum of said pair of audio signals and to have, over said 0 to $f_{max.}$ frequency spectrum, like phase deviations of the leading and trailing edges of said pulse-width-modulated carrier related to the difference of said pair of audio signals;
and transmitting said pulse-width-modulated carrier.

15. A system for receiving a television program accompanied by a compatible sound signal in the form of a carrier frequency-modulated by a pulse-width-modulated rectangular wave having leading edge modulation representing one of a pair of stereophonically related audio signals, having trailing edge modulation representing the other of said pair of audio signals, and having an average value equal to the sum of said audio signals, said system comprising:
means including a frequency modulation detector for deriving from said sound signal said pulse-width-modulated wave;
pulse-time demodulator means including a pair of signal translating channels individually terminating in an output terminal and further including gating means for controlling signal translation through said channels;
means for applying said pulse-width-modulated wave from said frequency modulation detector to said pulse time demodulator means;
means for applying a gating signal to said pulse-time demodulator means phased relative to said pulse-width-modulated wave to develop at the output terminal of one of said channels a first rectangular wave signal modulated at one of its edges only and representing one of said audio signals and concurrently to develop at the output terminal of the other of said channels a second rectangular wave signal modulated at one of its edges only and representing the other of said audio signals;
a pair of audio amplifier-loudspeaker arrangements spatially related for stereophonic sound reproduction;
and means, constituting an averaging circuit for audio frequencies, for coupling said amplifier-speaker arrangements to said output terminals.

References Cited

UNITED STATES PATENTS

| | | | |
|---|---|---|---|
| 2,479,947 | 8/1949 | Lord. | |
| 2,468,059 | 4/1949 | Grieg | 179—15 |
| 2,513,308 | 7/1950 | Grieg | 179—15 |
| 3,046,329 | 7/1962 | Reesor | 178—5.6 |

ROBERT L. GRIFFIN, *Primary Examiner.*

R. L. RICHARDSON, *Assistant Examiner.*